(12) United States Patent
Beck

(10) Patent No.: US 11,828,712 B2
(45) Date of Patent: Nov. 28, 2023

(54) SYSTEM AND METHOD FOR INSPECTING CONTAINERS USING MULTIPLE RADIATION SOURCES

(71) Applicants: INDUSTRIAL DYNAMICS COMPANY, LTD., Torrance, CA (US); Christian Beck, Torrance, CA (US)

(72) Inventor: Christian Beck, Torrance, CA (US)

(73) Assignee: Industrial Dynamic Company, Ltd, Torrance, CA (US)

( * ) Notice: Subject to any disclaimer, the term of this patent is extended or adjusted under 35 U.S.C. 154(b) by 0 days.

(21) Appl. No.: 15/579,574

(22) PCT Filed: Jun. 3, 2016

(86) PCT No.: PCT/US2016/035657
§ 371 (c)(1),
(2) Date: Dec. 4, 2017

(87) PCT Pub. No.: WO2016/196886
PCT Pub. Date: Dec. 8, 2016

(65) Prior Publication Data
US 2018/0172602 A1    Jun. 21, 2018

Related U.S. Application Data

(60) Provisional application No. 62/170,556, filed on Jun. 3, 2015.

(51) Int. Cl.
*G01N 21/90* (2006.01)
*G01N 21/958* (2006.01)
*G01N 21/88* (2006.01)

(52) U.S. Cl.
CPC ......... *G01N 21/9036* (2013.01); *G01N 21/90* (2013.01); *G01N 21/9009* (2013.01); *G01N 21/9018* (2013.01); *G01N 21/9027* (2013.01); *G01N 21/958* (2013.01); *G01N 2021/8845* (2013.01); *G01N 2201/0636* (2013.01); *G01N 2201/06146* (2013.01)

(58) Field of Classification Search
None
See application file for complete search history.

(56) References Cited

U.S. PATENT DOCUMENTS

| | | | | |
|---|---|---|---|---|
| 4,283,145 A * | 8/1981 | Miyazawa | ............. | G01N 21/90 359/201.1 |
| 4,681,442 A * | 7/1987 | Wagner | ............. | G01N 21/8806 250/559.44 |
| 4,682,023 A * | 7/1987 | Yoshida | ............. | G01N 21/9054 250/223 B |
| 6,753,527 B1 * | 6/2004 | Yamagishi | ........... | G01N 21/909 250/341.8 |
| 9,335,278 B2 * | 5/2016 | Kurosawa | ............. | G06T 7/0008 |

(Continued)

*Primary Examiner* — Tri T Ton
*Assistant Examiner* — Jarreas Underwood
(74) *Attorney, Agent, or Firm* — Howard M. Gitten, Esq.; Lewis Brisbois Bisgaard & Smith LLP

(57) ABSTRACT

An inspection system having a light source, a mirror sensor, and an image sensor. The mirror assembly is aligned with the camera; the light is reflected from the container to the camera, and the camera creates multiple images of the container at a viewing angle. The multiple images are analyzed to detect defects.

18 Claims, 6 Drawing Sheets

(56) References Cited

U.S. PATENT DOCUMENTS

| | | | |
|---|---|---|---|
| 2004/0150815 A1* | 8/2004 | Sones | G01N 21/9054 356/239.4 |
| 2007/0296956 A1* | 12/2007 | Haugholt | G01M 3/38 356/601 |
| 2010/0080442 A1* | 4/2010 | Sones | G01N 21/9036 356/240.1 |
| 2010/0225908 A1* | 9/2010 | Kwirandt | B07C 5/3408 356/239.4 |
| 2011/0102783 A1* | 5/2011 | Wiemer | G01N 21/9018 356/239.4 |
| 2012/0210935 A1* | 8/2012 | Nelen | F16J 15/14 118/712 |
| 2014/0268123 A1* | 9/2014 | Juvinall | G01N 21/9081 356/239.4 |

* cited by examiner

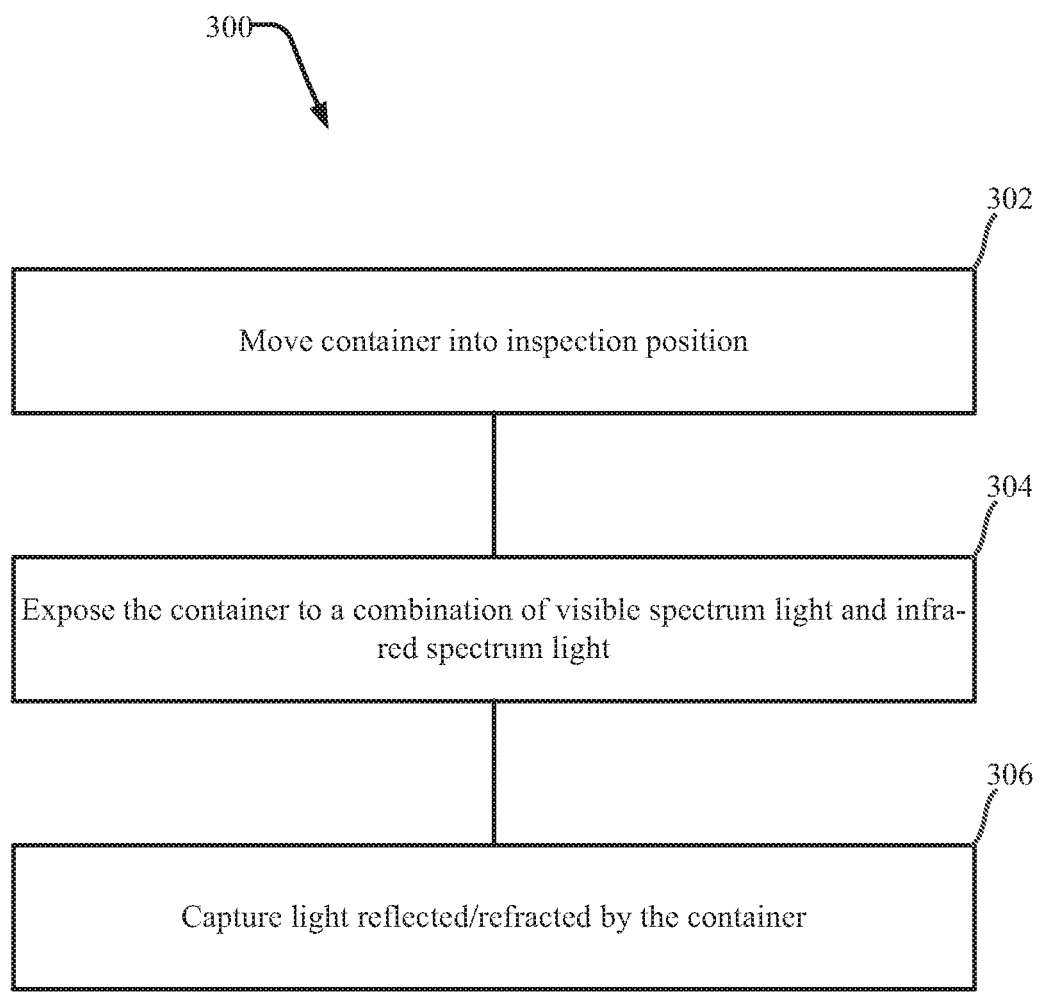

SYSTEM AND METHOD FOR INSPECTING CONTAINERS USING MULTIPLE RADIATION SOURCES

CROSS-REFERENCE TO RELATED APPLICATIONS

This application is a national phase application of International Application No. PCT/US2016/035657, filed Jun. 3, 2016, which claims the benefit of priority on U.S. Provisional Application No. 62/170,556, filed Jun. 3, 2015, the content of which are both incorporated by reference.

FIELD OF TECHNOLOGY

This disclosure relates generally to quality control, and more particularly to automated container inspection. This disclosure also relates to inspecting objects or containers (hollow or filled), for example bottles, jars, or vials, in particular made from glass or plastic, in order to detect defects or conditions of these containers.

BACKGROUND

Inspection systems for container and bottles are used e.g. in beverage bottling lines for detecting defective bottles. Beverages and the containers that house beverages undergo quality control procedures prior to and after distribution to consumers. This helps to minimize possible defects (e.g., foreign objects, filling issues, foam issues, and other issues), which may be hazardous to a consumer and/or may result in consumer complaints, from being within a container subsequent distribution.

Various techniques, using humans and/or machine automation, have been designed and implemented. These techniques can suffer when an obstruction, such as an applied ceramic label ("ACL"), is present on the tested container. For example, an object floating within the beverage of the container is not easily detectable when it is obstructed by the ACL.

Accordingly, there is always a need for an improved inspection system.

SUMMARY

The present disclosure relates to a device, a system and a method for inspecting containers, such as bottles, to detect conditions and defects (e.g., foreign objects) with increased efficiency (i.e., increased positive detection) and decreased false positives as compared to other systems and methods. Bottle features (e.g., ACL, scuffing, etc.) can be differentiated from foreign objects (e.g., paper, plastic capsule, cellophane, wood, etc.) with limited human intervention. One or more color and/or black/white cameras are placed about a conveyor. A mirror assembly can be used to enable an additional view of the container being inspected. A combination of radiation (e.g., visible radiation and infra-red radiation) can also be utilized. Depending on the specific implementation, an optical component (e.g., a beam splitter) may be used to coaxially align the sensors to the image.

Aspects of the present disclosure relate to a system for inspecting a container. Two or more radiation sources may be used. Alternatively, a single light source that generates a combination of radiation may be used. In one example, at least one radiation source generates visible light and at least one radiation source generates another wavelength of radiation (e.g., infra-red light or gamma or another wavelength of radiation). Optionally, a mirror assembly receives at least a portion of the radiation encountering the container. In one example, visible and infrared radiation reflected/refracted by the container is received by cameras or sensors, which generate images demonstrating whether a foreign object is present in the container. The one or more images are processed by a computer and software to detect conditions or defects in the container.

A further aspect of the present disclosure relates to a method for inspecting a container that includes moving the container into an inspection position using a conveyor. The container may be not specifically oriented within the inspection position. The container is exposed to multiple wavelengths of radiation captured by cameras or sensors. The captured radiation demonstrates whether a foreign object or defined condition is present in the container.

BRIEF DESCRIPTION OF THE DRAWINGS

FIG. 5 illustrates a method for inspecting a container according to the present disclosure.

DETAILED DESCRIPTION

This disclosure provides a device, system, and method for inspecting containers having a top and a bottom, such as bottles, with limited human intervention. Conditions are detected in the containers by differentiating between container features, including conditions (e.g., ACL, scuffing, etc.), and the target inspection type (e.g., foreign objects, fill level, foam, etc.). In certain specific embodiments, the device, system and method can include at least two radiation sources directed toward a container, one or more sensors or cameras capable of receiving radiation from the container to produce images of the container, image processing software capable of processing nearly identical images of the same container to determine the presence and location of an ACL, label, or other external artifact that can interfere with image analysis and/or produce false detection in the area of interest. The images can be obtained (e.g., simultaneously or near simultaneously) along the same or nearly the same optical axis by means of optical components (e.g., a beam splitter) or optical arrangement (e.g., mirrors, prisms, and lenses).

In certain embodiments, at least one image is captured using back lighting (transmissive) in which the image contains a dark shape in the area of the image where the external artifact is present because the artifact blocks the transmitted light. Another image is captured using front lighting (reflective) which produces an image of the external artifact. The front lit image is analyzed for the presence of known colors or gray scales. This allows the image processing software to identify the presence of an external artifact, along with its location. A software mask can be developed and overlaid on the backlit image to perform inspection around the external artifact to identify conditions partially obscured by the external artifact as well as ignoring the external artifact for purposes of detection of target conditions. This approach does not require the container to have a specific orientation.

One or more cameras or image sensors are placed on sides of a housing unit. The camera(s) may be color and/or black/white capturing cameras. The image sensor may be a sensor that detects and conveys the information that constitutes an image. A mirror assembly optionally can be used to enable an additional view of the container. A single radiation and or a combination of radiations (e.g., visible spectrum and infra-red spectrum radiation) are also utilized.

Figure 1:
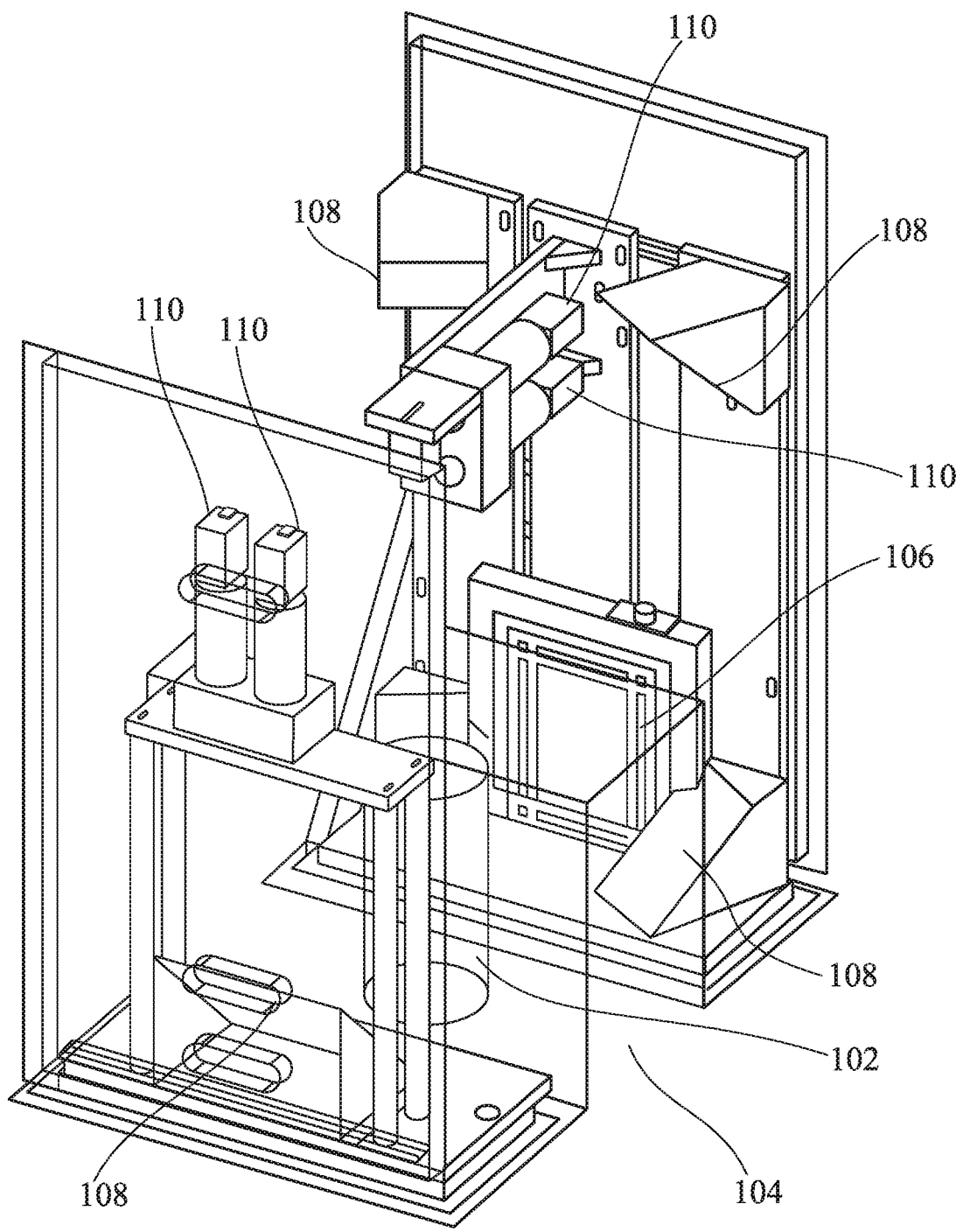
FIG. 1 illustrates a system for inspecting a container according to the present disclosure.

Referring to FIG. 1, an exemplary system 100 for inspecting a container 102 is described. The system 100 includes one or more radiation sources 106 (collectively referred to as radiation sources), one or more mirrors (collectively referred to as a mirror assembly 108), and cameras 110. The mirror assembly 108 and/or a beam splitter or the like (not illustrated) are implemented to align the cameras 110 (i.e., direct light refracted/reflected by the bottle 102 to the cameras 110). In this example, the camera may be replaced by one or more image sensors. In certain examples, the radiation may emanate from a back and a front light source, and a path of the radiation can be co-axial to the camera or sensor. The radiation should generate multiple, simultaneous or near simultaneous images of the container at the same viewing angle, which is possible through e.g., the use of a beam splitter. The containers or bottles can be introduced into the system 100 using a conveyor 104, The conveyor 104 moves the container 102 into an inspection position. Due to various aspects of the present disclosure, the container 102 does not need to be specifically oriented at the inspection position. One or more beams of radiation are projected upon the container 102 by the radiation source 106. A second radiation source 107 radiates the container 102. The radiation sources 106, 107 may include any suitable type of device, including a plurality of light emitting diodes (LEDs), incandescent bulbs, fluorescent bulbs, or any other suitable type of source. The beam(s) of light include a combination of at least two radiation wavelengths (e.g., visible spectrum light waves and infra-red waves). In another example, at least one visible spectrum radiation source and at least one infrared radiation source are used.

The mirror assembly 108 allow for the scaling of the system and practical operation of the system 100. A system without mirrors or a mirror assembly would likely be very large in order to achieve non-distorted or reproducible images. The mirror assembly 108 includes at least one reflective surface/structure placed to direct light beam(s) refracted/reflected by the container 102 to the cameras 110. The at least one reflective surface/structure may have a polygonal shape and/or cross-section. The at least one reflective surface/structure may also be convex or concave depending upon implementation. For example, light beam(s) refracted/reflected by the container 102 may encounter one reflective surface/structure prior to being received by a camera 110. In other examples, light beam(s) refracted/reflected by the container 102 may not engage a single reflective surface/structure prior to being received by a camera 110. In yet another example, light beam(s) refracted/reflected by the container 102 may engage more than one reflective surface/structure prior to being received by a camera 110.

The cameras 110 capture radiation (e.g., light) refracted and/or reflected by the container 102, and optionally reflected by the mirror assembly 108. The cameras 110, which may be traditional or semiconductor cameras having a lens and iris, use this captured radiation to generate images. The cameras 110 are placed on sides of the housing unit. For example, the cameras 110 may be symmetrically placed (i.e., the same number of cameras 110 are placed on each side of the conveyor 104). However, the cameras 110 may be asymmetrically placed about the conveyor 104 without departing from the scope of the present disclosure. The footprint of the system 100 may be reduced by reducing the number of cameras 110 implemented.

For example, color cameras 110 may be located on the same optical path or black/white cameras 110 may be located on the same optical path. For example, cameras 110 may be located on the same optical path or black/white cameras 110 may be located on the same optical path. In a further example, at least one color camera 110 and at least one black/white camera 110 are located on a single optical path. In one example, this allows the system 110 to use coordinates of the container's ACL, according to a visible spectrum light, as a reference for the infrared light, thereby allowing the system 100 to distinguish between a foreign object within the container 102 and the container's ACL.

Multiple types of images may be captured by the cameras 110. For example, visible and visible images at different wavelengths may be captured. In another example, visible and infrared images may be captured. For example, two visible images may be captured. The container 102 can encounter two wavelengths of radiation, and the cameras 110 are able to detect foreign objects within the container 102 by differentiating between container features (e.g., ACL, scuffing, etc.) and foreign objects (e.g., paper, plastic capsule, cellophane, wood, etc.).

In one specific embodiment, the device and system includes a processor, which may include a container inspection computer including memory coupled to the processor, and one or more interfaces coupled to the processor and coupled to one or more input devices (e.g. image sensors, position sensors, user interfaces, etc.) and/or one or more output devices (e.g. light sources, material handlers, displays, etc.). The computer further may include any ancillary devices, for example, clocks, internal power supplies, and the like (not shown). The processor may process data and execute instructions that provide at least some of the functionality for the presently disclosed device and system. As used herein, the term "instructions" may include, for example, control logic, computer software and/or firmware, programmable instructions, or other suitable instructions. The memory may include any computer readable medium or media configured to provide at least temporary storage of at least some data, data structures, an operating system, application programs, program modules or data, and/or other computer software or computer-readable instructions that provide at least some of the functionality of the presently disclosed apparatus and that may be executed by the processor. The data, instructions, and the like may be stored, for example, as look-up tables, formulas, algorithms, maps, models, and/or any other suitable format.

Figure 2B:
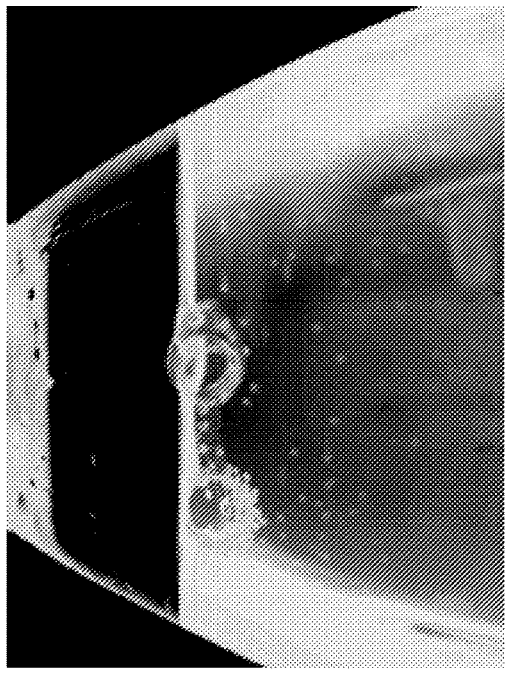
FIGS. 2A through 2D illustrate advantages of the system according to the present disclosure.
Figure 2D:
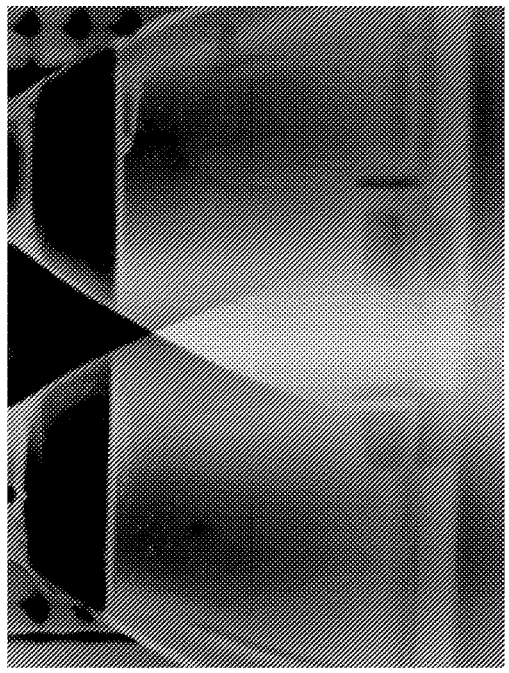
Figure 2A:
Figure 2C:
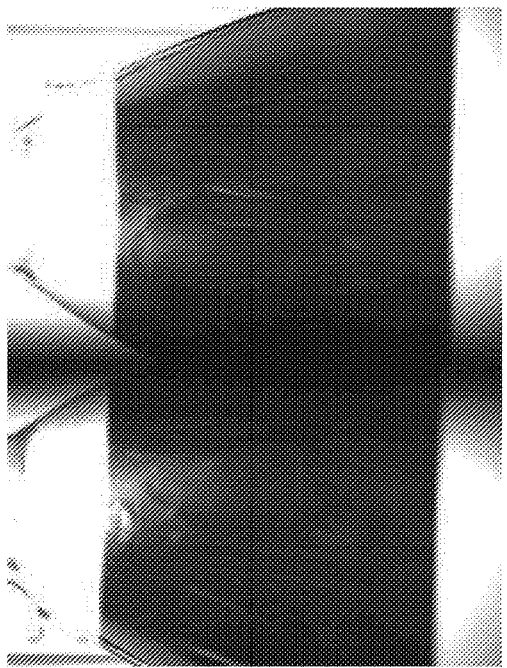

FIGS. 2A through 2D illustrate some of the advantages of the system 100 and method 300 (discussed in detail below). Specifically, FIG. 2A illustrates single view visible light capture and FIG. 2B illustrates single view infrared light capture. FIG. 2C illustrates dual view visible light capture and FIG. 2D illustrates dual view infrared light capture. Operation of the system 100 follows directly from this description.

Figure 3A:
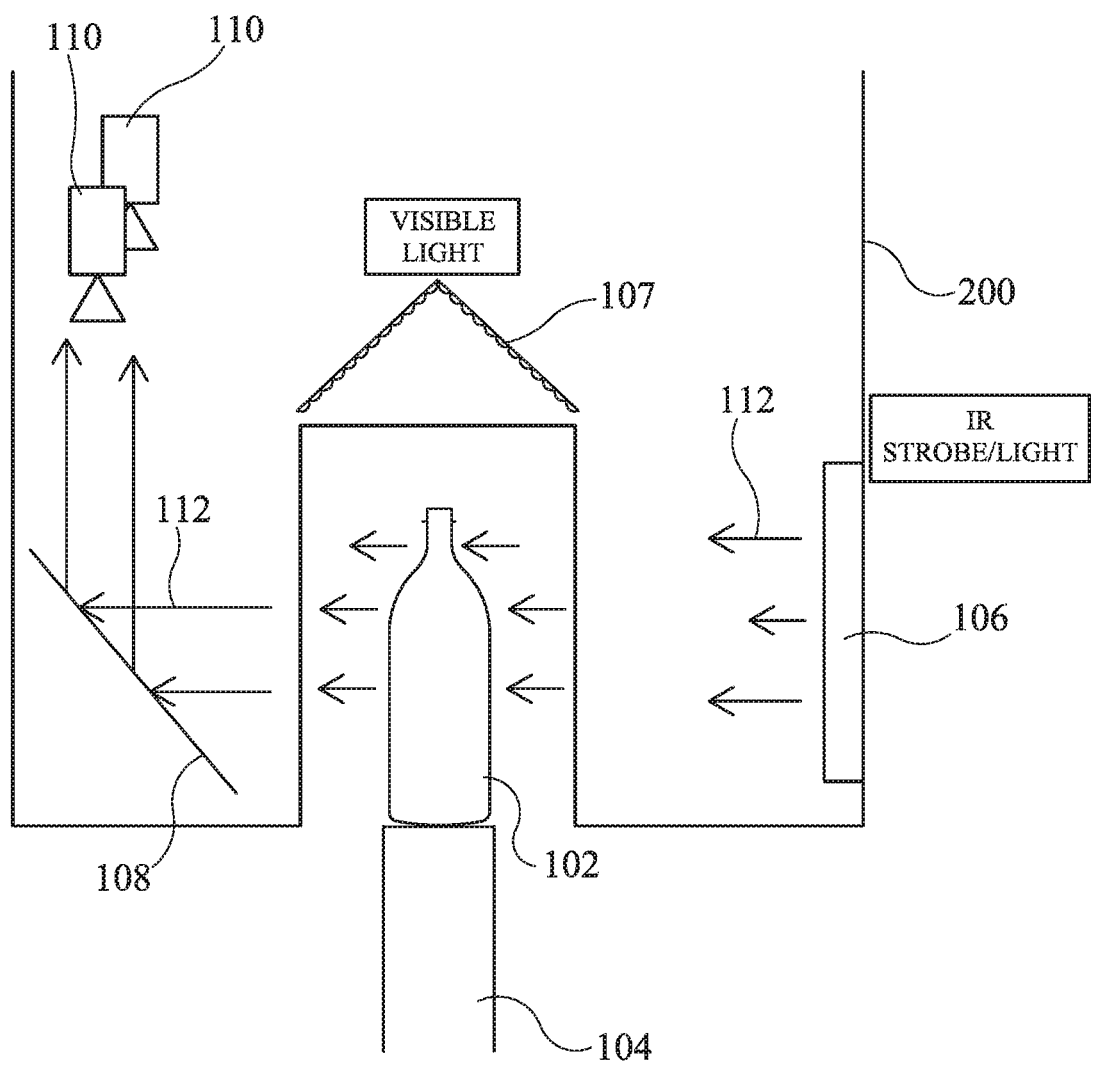
FIGS. 3A and 3B illustrate the general beam paths from radiation sources to the camera or sensor in an exemplary embodiment.
Figure 3B:
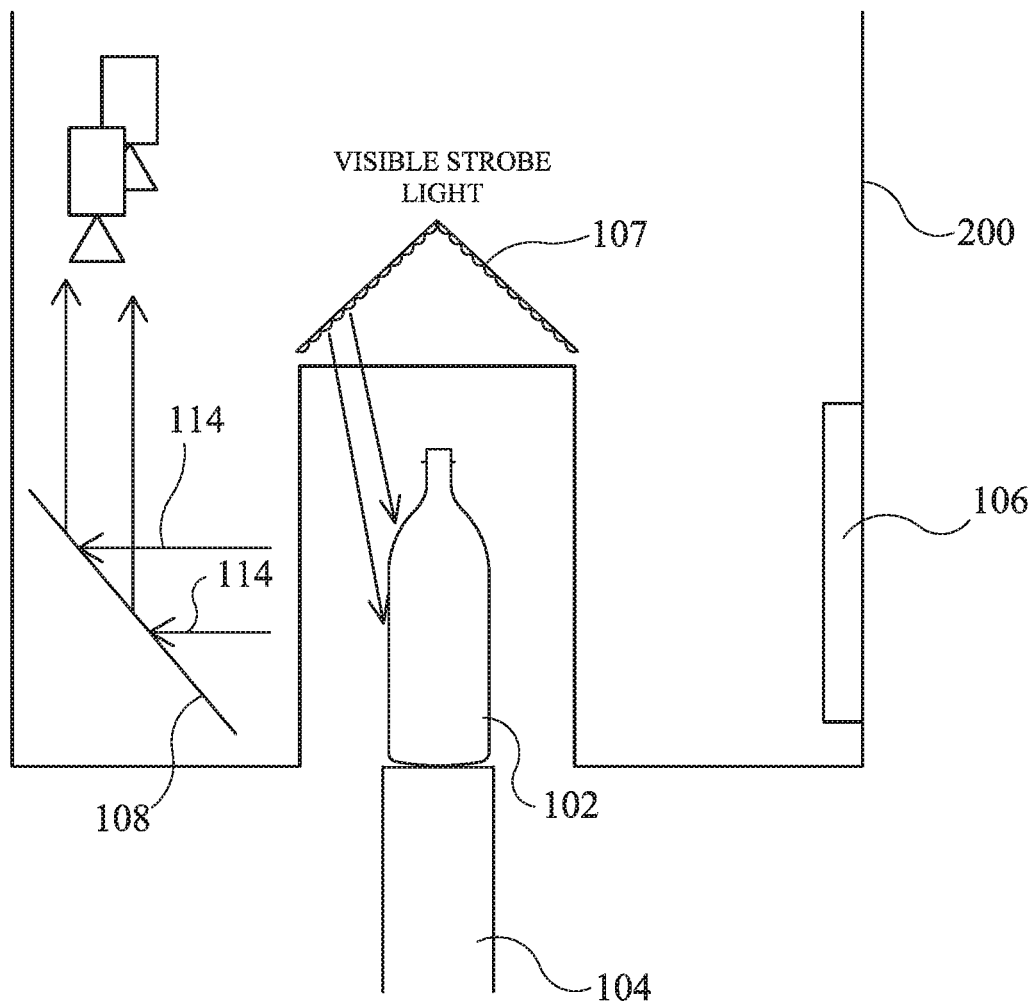

Referring to FIGS. 3A and 3B, another exemplary system 100 for inspecting a container 102 is described. The system 100 includes two radiation sources 106, 107, one or more mirrors or reflective surfaces (collectively referred to as a mirror assembly 108), and two or at least two cameras 110. The mirror assembly 108 and/or a beam splitter or the like (not illustrated) are implemented to align the cameras 110 (i.e., direct light refracted/reflected by the bottle 102 to the cameras 110). In certain examples, a first source of radiation may emanate from a back or a front light source and a path of the radiation can be coaxial to the camera or sensor. A second source of radiation (e.g., above the container 102) should radiate the container 102 and then be directed to a camera or sensor 110. The radiation should generate multiple, simultaneous or near simultaneous images of the container at the same viewing angle.

As can be seen, radiation travels from the radiation sources to the cameras or sensors. In FIG. 3A, a side view shows the visible light 112 from the first radiation source 107 irradiates the bottle 102 and is then reflected to a mirror 108 and ultimately to a sensor or camera 110. In FIG. 3B, infrared radiation 106 irradiates the bottle or container 102, which is reflected by a mirror or reflective surface to a second camera 110 or sensor. In this example, the light source 107 is positioned above where the bottle 102 would enter the unit or system 100 and the infrared radiation source 106 is positioned near the base of the container 102 where the container would enter the unit or system 100. The radiation sources 106, 107 can be encased in housing 200. In one example, one of the sensor or cameras 110 captures black and white light and the other captures a color spectrum of light.

Figure 4:
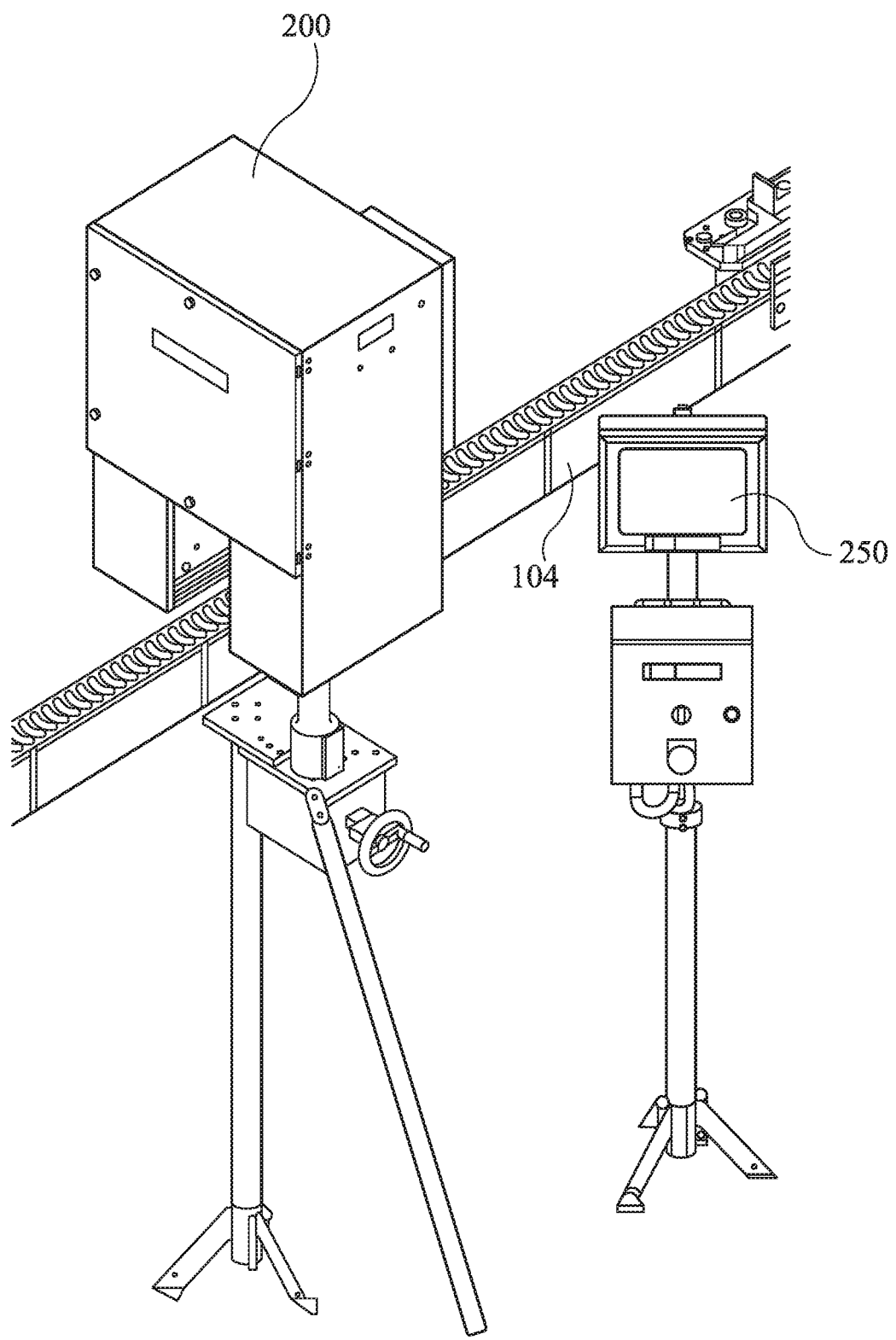
FIG. 4 shows a system on a conventional inspection line.

FIG. 4 shows that the inspection system 100 can be in a housing or cabinet 200 mounted in position along a container conveyor or line 104. As can be seen, bottles or containers 102 can transported into the inspection system 100 by a conveyer or line 104. The computer or processor 250 can be external to the housing or cabinet 200. The system be adjustable as illustrated herein.

Referring now to FIG. 5, a method 300 for inspecting a container is described. At block 302 a container is moved into an inspection position. In an example, the container may be moved into the inspection position by a conveyor. However, once at the inspection position, the container does not need to be specifically oriented.

At block 304 the container is exposed to a combination of visible spectrum light and infrared spectrum light. A single light source or multiple light sources may be used.

At block 306 light refracted and/or reflected by the container is captured by cameras. The captured light is used to generate images that may be in color and/or black/white depending upon the cameras used. Some or all of the cameras may be oriented along a single optical path. This allows coordinates of the container's ACL from the visible light to be used as a reference for the infra-red light (i.e., allows for foreign objects within the container to be distinguished from the container's ACL). The light detected by the cameras may be directed by a mirror assembly containing at least one reflective surface/structure. The operation of the system 100 follows directly from the preceding description.

The device, systems, and method are each designed to equip any machine for producing containers at a fast pace, at an inspection device/station using suitable means. The production machine and the means for bringing the container to the inspection device and the container handling means are not described, as they are well known and are not precisely part of the subject-matter of the disclosure. The device and system can be mounted on the chassis of an inspection machine integrated or attached in the production machine. In the illustrated example, it should be noted that the containers can be brought to the inspection system in an upright or vertical position, such that the axis of symmetry of the bottle can be considered to extend in a vertical direction.

In another embodiment, the image and light are processed using electronics including a processor. The processor may be suitably connected to an image library in order to rapidly compare detected characteristics with image characteristics in the library.

In another implementation, detection may be carried out in real-time or near real time. A feature detected in a sensor may be correlated to an inspection feature in another sensor.

In another embodiment, detection may be carried out offline or delayed. In this implementation, reflected and/or refracted radiation patterns (location, intensity, size, orientation, etc.) may be imaged and stored. The stored radiation patterns may be analyzed or used as a reference against which light patterns acquired during subsequent container inspections can be compared. In this way, characteristics of reflected and/or refracted light in addition to intensity (e.g., its orientation or angle) can be analyzed. A wide range of light patterns may be cataloged or otherwise stored to establish a wide range of acceptable and/or unacceptable commercial variation reflection and/or refraction patterns for a given container size and shape. Then, light patterns captured during actual container inspections can be compared to the stored light patterns to determine if the light pattern captured during inspection is representative of a light pattern generated by an unacceptable commercial variation. This system may also permit identification of the type of unacceptable commercial variation (e.g. check or blister) as well as its location on the container neck finish. Lenses may be used in this implementation to focus the reflected and/or refracted light onto an imaging sensor or other light receiver and detector.

Although the present disclosure and its advantages have been described in detail, it should be understood that various changes, substitutions, and alterations can be made herein without departing from the spirit and scope of the disclosure as defined by the appended claims. Moreover, the scope of the present disclosure is not intended to be limited to the particular configurations of the process, machine, manufacture, composition of matter, means, methods, and steps described. As one of ordinary skill in the art will readily appreciate from the present disclosure, processes, machines, manufacture, compositions of matter, means, methods, or steps presently existing or later developed that perform substantially the same functions or achieve substantially the same result as the corresponding configurations described herein may be utilized according to the present disclosure. Accordingly, the appended claims are intended to include within their scope such processes, machines, manufacture, compositions of matter, means, methods, or steps.

What is claimed is:

1. An inspection system for a container comprising:
   (a) a first radiation source that produces a first radiation having a first wavelength and radiates the container in a first beam path,
   (b) a second radiation source that produces a second radiation having a second wavelength and radiates the container in a second beam path,
   (c) a beam splitter,
   (d) a mirror assembly comprising at least one reflective surface,
   (e) a first sensor in the first beam path,
   (f) a second sensor in the second beam path, wherein the first radiation reflects from the container to a first image sensor to produce a first image, the second radiation reflects from the container to a second image sensor to produce a second image, and the first image and the second image of the container are at a combined viewing angle; and the first radiation and the second radiation have distinct wavelengths; and wherein the mirror assembly has at least one reflective surface placed to direct light reflected by the container to the two image sensors; and visible and infrared radiation reflected and refracted by the container is received by sensors that generate images demonstrating whether a foreign object is in the container.

2. The system of claim 1, wherein a first sensor captures a black and white light and the second sensor captures a color spectrum; the first radiation source radiates full spectrum light and the second radiation source radiates infrared radiation.

3. The system of claim 1, further comprising an image processor that compares the first image and the second image and uses an algorithm to detect defects in the container.

4. The system of claim 1, wherein the first or the second sensor is a camera, and the first or the second camera is an analog or digital camera having imaging optics.

5. The system of claim 1, wherein the first sensor and the second sensor synchronously capture images.

6. The system of claim 1, further comprising a third sensor and a third beam path.

7. The system of claim 1, further comprising a fourth sensor and a fourth beam path.

8. The system of claim 1, wherein the first beam path and the second beam path each has a separate mirror.

9. The system of claim 1, wherein the first radiation source radiates the container from above the container.

10. The system of claim 9, wherein the second radiation source radiates the container from a side of the container.

11. The system of claim 1, wherein a first sensor captures a black and white light image and a second sensor captures a color spectrum image.

12. A method of inspecting a container, comprising:
(a) conveying the container into beam paths of two radiation sources, wherein a first radiation source produces a first radiation having first wavelength, the second radiation source produces a second radiation having a second wavelength, and the first radiation and the second radiation have distinct wavelengths;
(b) radiating the container with the first radiation source and the second radiation source to create at least two images, wherein the images are images of the container along a combined optical axis;
(c) processing the first radiation and the second radiation from the container with a camera and processor to create a first image and a second image; and
(d) detecting a defect in the container using an algorithm using data from the first and second images,
wherein visible and infrared radiation is reflected and refracted by the container and is received by sensors to generate images demonstrating whether a foreign object is in the container.

13. The method of claim 12, further comprising a mirror assembly comprising at least one reflective surface.

14. The method of claim 12, wherein the first sensor and the second sensor synchronously capture images.

15. The method of claim 14, wherein the first radiation source radiates full spectrum light, and wherein the second radiation source radiates infrared radiation.

16. The method of claim 12, wherein the first radiation source is positioned above the container and radiates the container from above the container.

17. The method of claim 16, wherein the second radiation source radiates the container from a side of the container.

18. A inspection system for a container comprising:
a first radiation source that produces a first radiation having a first wavelength and radiates the container in a first beam path, wherein the first radiation source is positioned above the container and radiates the container from above the container;
a second radiation source that produces a second radiation having a second wavelength and radiates the container in a second beam path, wherein the second radiation source radiations radiate the container at the base or side of the container;
a beam splitter,
a mirror assembly comprising at least one reflective surface,
a first sensor in the first beam path,
a second sensor in the second beam path, wherein the first radiation reflects from the container to a first image sensor to produce a first image, the second radiation reflects from the container to a second image sensor to produce a second image, and the first image and the second image of the container are at a combined viewing angle; the first radiation and the second radiation have distinct wavelengths; and the mirror assembly has at least one reflective surface placed to direct light reflected by the container to the two image sensors.

* * * * *